Oct. 12, 1926.
L. C. BULMER ET AL
1,602,479
SLIDE RULE
Filed July 5, 1924
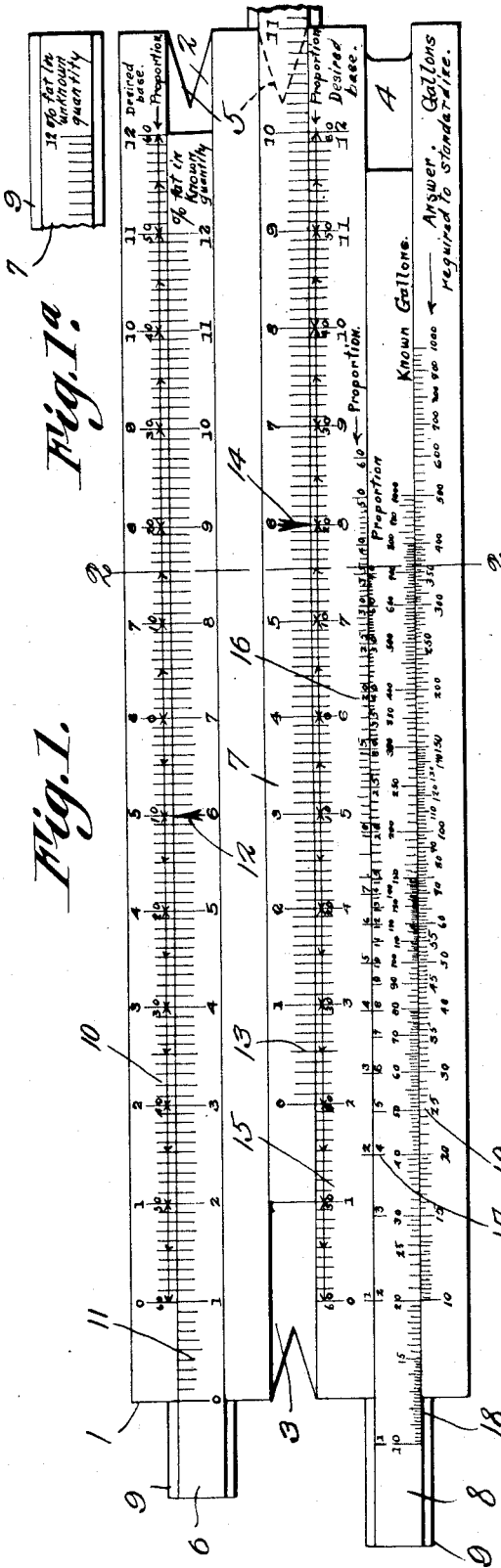
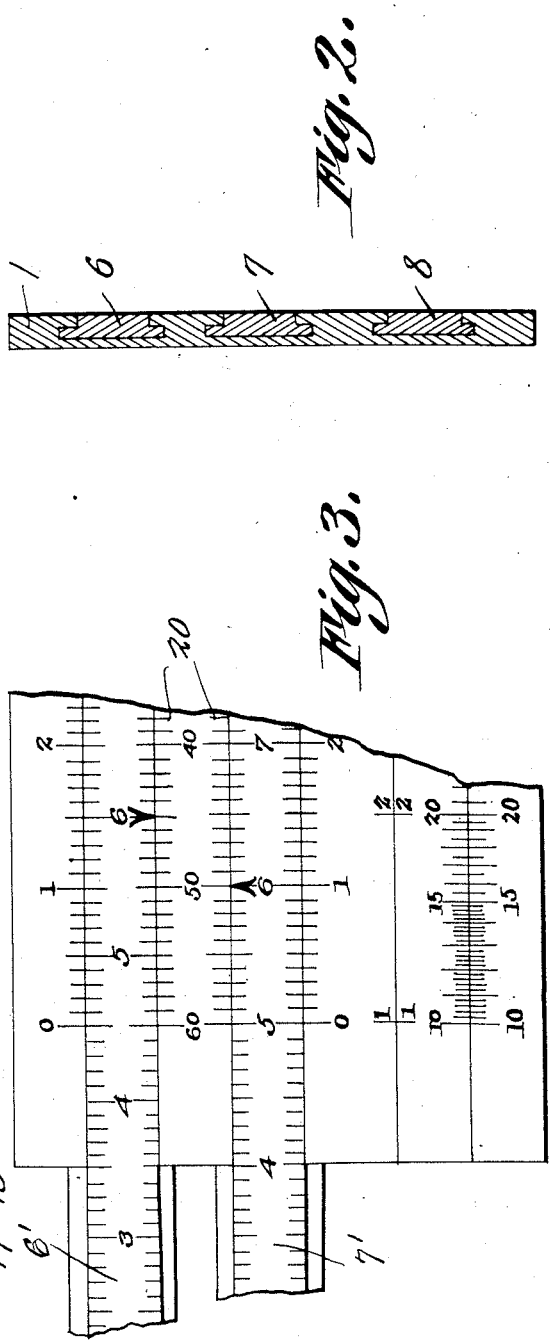
L.C. Bulmer
W.A. Hardenbergh
J.H. Fike
Inventors.
By C.A. Snow & Co.
Attorneys.

Patented Oct. 12, 1926.

1,602,479

UNITED STATES PATENT OFFICE.

LEONARD C. BULMER, WILLIAM A. HARDENBERGH, AND JAMES H. FIKE, OF BIRMINGHAM, ALABAMA.

SLIDE RULE.

Application filed July 5, 1924. Serial No. 724,493.

This invention relates to a slide rule designed primarily for use in standardizing milk, while its principle may also be adapted to the standardization of cream if desired.

It is a well known fact that the regulations of most communities require not less than a certain established percentage of butter fat in milk sold and one of the most difficult problems confronting the dairyman is the correct blending of different grades of milk so that the resultant mixture will comply strictly with the required standard. In most instances, however, there is a certain percentage of butter fat in the mixture in excess of the standard required and while such excess, even though amounting to but .3% of butter fat and being unnoticed and uncredited by the consumer would, nevertheless involve a financial loss of from $17,000 to $18,000 per annum to a company handling five thousand gallons of milk per day. It will thus be seen that a means for accurately determining the proper proportions of different grades of milk required to obtain a mixture of the exact standard required is very essential because of the saving resulting therefrom and while various devices for this purpose have been evolved they have all required more or less mental calculations resulting in inaccuracies that have affected the product.

One of the objects of the present invention is to provide a slide rule having relatively movable scales by the manipulation of which it is possible to determine the amount of milk having a known percentage of butter fat required to standardize either a known quantity or an indefinite quantity of milk having a known percentage of butter fat, the construction and operation of the slide rule being such that the same can be manipulated and used by any employee who can read.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:—

Figure 1 is a plan view of the slide rule, one of the slides being broken away.

Fig. 1ᵃ is a plan view of that portion of one of the slides not shown in Fig. 1.

Fig. 2 is a section on line 2—2, Fig. 1.

Fig. 3 is a plan view of a portion of a modified construction.

Referring to the figures by characters of reference 1 designates an elongated base provided with parallel grooves 2, 3 and 4 spaced from each other and from the longitudinal edges of the base, the walls of each groove being undercut and the bottom of each groove being cut away at its ends to provide finger receiving spaces 5. A slide 6 is slidable within the groove 2 and additional slides 7 and 8 are movably mounted within the grooves 3 and 4 respectively, each of these slides 6, 7 and 8 being provided along its sides with longitudinal ribs 9 adapted to project into the undercut walls of the grooves so as to hold the slides assembled with the base while allowing them to move longitudinally.

Formed on that portion of the base between the grooves 2 and the adjacent longitudinal edge of the base is a scale 10 made up of numbered spaces, each space being subdivided by graduations as shown and the numbers of the spaces ranging preferably from "0" and "1" to "12" or any other desired figure. This scale is provided at one end with the legend "Desired base". The numbered graduations of the scale are also provided with additional designating numerals, the intermediate graduation indicated by the numeral "6" of the first scale being also designated by the character "0". The numbered graduations of the two sides of this "0" graduation are designated by the numerals "10", the next numbered graduations are indicated by the numerals "20"; and this numbering is continued successively by tens up to "60". The portion of the scale indicated by these numerals "0" to "60" may be connected by lines and the said lines as well as the numerals "0" to "60" can be red or of any other color differing from that used in numbering the "desired base" scale. This second scale ranging from "0" to "60" is provided with the legend "Proportion" preferably located under the legend "desired base".

The slide 6 is provided with a scale 11 corresponding with the "desired base" scale and having numbered spaces preferably ranging from "0" and "1" to "12" although the numbers can range to "60". The spaces between these numbered graduations are graduated to correspond with the graduations of the scale 10 and the said scale 11 is provided at one end with the legend "% fat in known quantity". The slide 6 has an index or pointer mark 12 thereon at the central or "6" graduation.

The slide 7 is provided with a scale 13 corresponding with the scale 11 and provided at one end with the legend "% fat in unknown quantity". This scale also has an indicator or pointer 14 marked thereon at the central or "6" graduation.

Formed on the space between the grooves 3 and 4 and along the edge of the groove 3 is a double scale 15 corresponding in every way with the double scale 10, the line of graduations designated by the characters "0" to "60" being designated by the legend "Proportion" while the characters "0" to "12" of said scale are provided with the designating legend "Desired base".

Formed on the base between the grooves 3 and 4 and close to the edge of the groove 4 is a scale 16 made up of graduations at different distances apart as shown and marked from "1" to "60", these graduations being provided with the designating legend "Proportion".

Formed on the slide 8 at that edge adjoining the scale 16 is a scale 17 the graduations of which are designated preferably by numerals "1" to "60" or more and are different distances apart as shown, this scale being provided with the legend "Proportion". Another scale 18 is provided along the other edge of the slide and the main graduations thereof are designated by the numerals indicating gallons, these numerals ranging from "10" to "1,000" in the present instance. The scale shown is provided with the legend "Known gallons". Formed on the base close to the scale 18 is a scale 19, the main graduations of which are designated by numerals ranging from "10" to "1,000" and this scale has the legend "Answer. Gallons required to standardize".

In order to compute the data required in standardizing milk to the desired base, two steps are necessary, namely, first, to arrive at the proportions in which two milks of known fat content have to be mixed to produce a milk of the desired fat content base; and second, when the proportions required of the two milks are determined, the actual gallons or pounds of one milk to be added to the next quantity of the other milk, are determined in order to arrive at the result.

The following example is given showing how the slide rule can be used:—

How much milk containing 1% butter fat will be required to standardize 400 gallons of milk containing 4% butter fat to a base of 3% butter fat?

Step 1. The graduation on slide 6 indicating 4% is placed opposite and under the desired content of butter fat (3%) on the scale 10 as shown in Fig. 1.

Step 2. 1% on slide 7 is placed directly opposite and over the desired content of butter fat (3%) on scale 15. With the parts thus located it will be found that the "10" graduation of the "proportion" part of the scale 10 will be designated by the index 12 while the "20" graduation of the "proportion" part of scale 15 will be designated by the index 14. This will therefore disclose the fact that ten parts of 1% butter fat milk will be required for twenty parts of 4% butter fat milk or a proportion of 1 to 2.

Step 3. The proportion needed being 10 to 20 or 1 to 2 the "1" graduation of the scale 16 is placed opposite the "2" graduation of the scale 17 whereupon it will be found that the "400" graduation on scale 18, indicating 400 gallons of 4% butter fat milk to be standardized will be found directly opposite the "200" graduation of scale 19 giving the answer that 200 gallons of 1% butter fat milk are required to standardize 400 gallons of 4% butter fat milk to the desired base of 3% butter fat milk.

Instead of providing double markings on the scale 10 and on the scale 15 as shown in Fig. 1, scale 20 can be arranged on the base between the slides 6' and 7' as shown in Fig. 3, the main graduations of these scales being numbered from "0" to "60" as heretofore described. Where this arrangement of the "proportion" scales is employed each slide 6' and 7' has its graduations duplicated at the two edges thereof as shown in Fig. 3.

It is to be understood that the slide rule herein disclosed can be utilized not only for standardizing milk but also for standardizing cream, it being merely necessary to change the range of the scale so that it will be adapted to the standardization of cream. Furthermore instead of utilizing gallons as units of measure in using the slide rule, pints or other units may be used or if preferred, pounds may be used. It is to be understood, therefore, that the term "gallons" as used in the claims is to be considered broad enough to apply either to pints, pounds or other units of measure.

In practice it has been found that while the slide rule disclosed is designed primarily for standardization purposes, it can also be used for solving mathematical problems.

For example the two top slides and their adjacent scales can be utilized in subtraction.

What is claimed is:—

In a slide rule a scale of a desired base having a zero point at its center and numbered in both directions from the zero point to indicate a proportion, and a movable member having a scale similar to the first named scale but having a zero point at one end and numbered in one direction therefrom, there being an index point at the center of said second scale.

In testimony that we claim the foregoing as our own, we have hereto affixed our signatures.

LEONARD C. BULMER.
WILLIAM A. HARDENBERGH.
JAMES H. FIKE.